(12) United States Patent
Schaeffer et al.

(10) Patent No.: US 9,241,373 B2
(45) Date of Patent: Jan. 19, 2016

(54) AIR CONDITIONING DEVICE FOR SEATS

(75) Inventors: Jürgen Schaeffer, Starnberg-Perchting (DE); Michael Weiss, Benediktbeuren (DE); Denise Philipp, München (DE)

(73) Assignee: GENTHERM GMBH, Odelzhausen (DE)

( * ) Notice: Subject to any disclaimer, the term of this patent is extended or adjusted under 35 U.S.C. 154(b) by 597 days.

(21) Appl. No.: 12/738,345

(22) PCT Filed: Aug. 29, 2008

(86) PCT No.: PCT/DE2008/001422
§ 371 (c)(1),
(2), (4) Date: Mar. 31, 2011

(87) PCT Pub. No.: WO2009/049577
PCT Pub. Date: Apr. 23, 2009

(65) Prior Publication Data
US 2011/0290785 A1 Dec. 1, 2011

(30) Foreign Application Priority Data

| Oct. 18, 2007 | (DE) | 20 2007 014 701 U |
| Nov. 9, 2007 | (DE) | 10 2007 053 870 |
| Feb. 28, 2008 | (WO) | PCT/DE2008/000352 |
| Mar. 13, 2008 | (DE) | 10 2008 014 009 |
| Apr. 9, 2008 | (DE) | 10 2008 018 095 |

(51) Int. Cl.
*H05B 3/02* (2006.01)
*H05B 3/34* (2006.01)
(Continued)

(52) U.S. Cl.
CPC .............. *H05B 3/342* (2013.01); *B60N 2/5685* (2013.01); *H05B 3/56* (2013.01); *H05B 2203/003* (2013.01); *H05B 2203/004* (2013.01);
(Continued)

(58) Field of Classification Search
USPC ......... 219/538, 549, 528, 505, 544, 529, 212, 219/217, 545, 553, 202, 211, 552; 338/214, 338/259, 243, 270, 208, 210, 211, 275, 262, 338/258, 212, 332; 392/416, 435, 436, 437, 392/480, 481
See application file for complete search history.

(56) References Cited

U.S. PATENT DOCUMENTS

| 4,245,149 A | 1/1981 | Fairlie |
| 5,558,794 A * | 9/1996 | Jansens .................. 219/549 |

(Continued)

FOREIGN PATENT DOCUMENTS

| DE | 2157356 A1 | 5/1973 |
| DE | 3513909 | 10/1986 |

(Continued)

OTHER PUBLICATIONS

International Search Report, Application No. PCT/DE2008/001422, dated Jun. 4, 2009, published as WO2009/049577.

(Continued)

*Primary Examiner* — Phuong Nguyen
(74) *Attorney, Agent, or Firm* — The Dobrusin Law Firm P.C.

(57) ABSTRACT

The present invention concerns a electrical conducting (control) device (5). It is provided that it exhibits at least one conducting-part carrier (5.2) and at least one conducting part (5.1), which is disposed at least partially on and/or for the conducting-part carrier (5.2).

20 Claims, 3 Drawing Sheets

(51) Int. Cl.
*B60N 2/56* (2006.01)
*H05B 3/56* (2006.01)

(52) U.S. Cl.
CPC ..... *H05B2203/009* (2013.01); *H05B 2203/029* (2013.01); *H05B 2203/033* (2013.01); *H05B 2214/04* (2013.01)

(56) References Cited

U.S. PATENT DOCUMENTS

| | | | |
|---|---|---|---|
| 5,735,338 A * | 4/1998 | Chevroulet et al. | ............. 165/42 |
| 5,824,996 A | 10/1998 | Kochman et al. | |
| 5,861,610 A | 1/1999 | Weiss | |
| 5,904,874 A | 5/1999 | Winter | |
| 5,921,314 A | 7/1999 | Schuller et al. | |
| 6,005,232 A * | 12/1999 | Janvrin et al. | ................ 219/549 |
| 6,057,530 A | 5/2000 | Gurevich | |
| 6,064,037 A | 5/2000 | Weiss et al. | |
| 6,084,217 A | 7/2000 | Bulgajewski | |
| 6,111,234 A | 8/2000 | Batliwalla et al. | |
| 6,147,332 A | 11/2000 | Holmberg et al. | |
| 6,150,642 A | 11/2000 | Weiss et al. | |
| 6,164,719 A | 12/2000 | Rauh | |
| 6,166,352 A * | 12/2000 | Turton | ........................ 219/213 |
| 6,189,487 B1 | 2/2001 | Owen et al. | |
| 6,229,123 B1 | 5/2001 | Kochman et al. | |
| 6,294,758 B1 | 9/2001 | Masao et al. | |
| 6,369,369 B2 | 4/2002 | Kochman et al. | |
| 6,415,501 B1 | 7/2002 | Schlesselman | |
| 6,426,485 B1 | 7/2002 | Bulgajewski et al. | |
| 6,439,658 B1 | 8/2002 | Ganz et al. | |
| 6,452,138 B1 | 9/2002 | Kochman et al. | |
| 6,483,087 B2 | 11/2002 | Gardner et al. | |
| 6,501,055 B2 | 12/2002 | Rock et al. | |
| 6,664,512 B2 | 12/2003 | Horey et al. | |
| 6,686,562 B1 | 2/2004 | Weiss et al. | |
| 6,710,303 B1 | 3/2004 | Lorenzen | |
| 6,713,733 B2 | 3/2004 | Kochman et al. | |
| 6,838,647 B2 | 1/2005 | Nagele | |
| 6,906,293 B2 | 6/2005 | Schmiz et al. | |
| 7,040,710 B2 | 5/2006 | White et al. | |
| 7,053,344 B1 | 5/2006 | Surjan et al. | |
| 7,202,444 B2 | 4/2007 | Bulgajewski | |
| 7,205,510 B2 | 4/2007 | Howick | |
| 7,223,948 B2 | 5/2007 | Howick et al. | |
| 7,306,283 B2 | 12/2007 | Howick et al. | |
| 7,510,239 B2 | 3/2009 | Stowe | |
| 7,560,670 B2 | 7/2009 | Lorenzen et al. | |
| 2002/0117495 A1 | 8/2002 | Kochman et al. | |
| 2004/0004070 A1 * | 1/2004 | Sullivan et al. | ................ 219/494 |
| 2005/0107572 A1 * | 5/2005 | Bastioli et al. | ................ 528/271 |
| 2005/0200179 A1 | 9/2005 | Bevan et al. | |
| 2006/0217495 A1 * | 9/2006 | Shiga et al. | .................... 525/440 |

FOREIGN PATENT DOCUMENTS

| | | | |
|---|---|---|---|
| DE | 199 20 451 | | 12/1999 |
| DE | 10243584 A1 | | 4/2003 |
| EP | 0909638 | * | 4/1999 ............. B32B 27/32 |
| EP | 1783785 A | | 5/2007 |
| JP | 03145089 A | | 6/1991 |
| JP | 2003/332030 A | | 11/2003 |
| JP | 2004/249092 A | | 1/2004 |
| WO | 94/09684 A1 | | 5/1994 |
| WO | 02/06914 A1 | | 1/2002 |
| WO | 2004/082989 | | 3/2004 |
| WO | 2004/114513 A1 | | 12/2004 |
| WO | 2005/047056 | | 5/2005 |
| WO | 2007/065424 A | | 6/2007 |
| WO | 2009/049577 A1 | | 4/2009 |

OTHER PUBLICATIONS

Korean Search Report, Application No. 10-2010-70000333, dated May 12, 2011.
Korean Search Report, Application No. 10-2010-70000333, dated Jan. 10, 2012.

* cited by examiner

AIR CONDITIONING DEVICE FOR SEATS

CLAIM OF PRIORITY

The present application claims priority from the 29 Aug. 2008 filed PCT Application PCT/DE2008/001422, which claims priority from German Application Nos. DE 20 2007 014 701.5; 10 2007 053 870.9; 10 2008 014 009.0; 10 2008 095.5; and PCT Application PCT/DE2008/000352, filed on 18 Oct. 2007; 9 Nov. 2007; 13 Mar. 2008; 9 Apr. 2008; and 28 Feb. 2008 respectively, disclosure of which is hereby incorporated by reference herein.

BACKGROUND FOR THE INVENTION

One object of the present invention is an electrical conducting device according to the general terms of claim 1, in particular for heating equipment.

It is well known that graphite particles are used to insert into a synthetic material and to use as a resistance unit. In addition, carbon fibers are known to be used as heat conductors in textile heating elements. Metal wires are also known to be laid on textile surfaces and inserted as heating elements.

Electrical temperature-adjustment devices are being offered which are increasing safety requirements, high cost pressure, and the growing diversification of usages. Hence a need exists for technical solutions that comprehensively fulfill as many of these requirements as possible.

OBJECT OF THE INVENTION

Against this background, a technical concept is proposed with the features of claim 1. Further advantageous embodiments may be derived from the further claims and the following description.

A fundamental object of the present invention concerns an electrical conducting device with one or several strand-shaped conducting-part carriers. One or several of these conducting-part carriers are made entirely or partly of a synthetic material (for example, polyester, polyamide, or polyurethane). One or several of these conducting-part carriers are partially or essentially completely, extensively or intermittently, provided with a noble metal (gold, silver, palladium, etc., for instance), which serves as a primer. Preferably disposed on the primer on one or several conducting-part carriers is a metal coating made of a highly conductive material (copper or nickel, for example) as a conducting part. The conducting part is preferably covered entirely or partly with a electrically conducting sheathing, which preferably exhibits a higher corrosion resistance than the conducting part. For this, nickel, iron or alloys with these two materials, for instance, can be involved. Such a conducting device and/or conducting strand manufactured with such a conducting device preferably exhibits an electrical resistance from 1 to 50 Ω/m. Such a conducting device is readily contactable and possesses, for example, a heating device as a resistance device. Such a conducting device also exhibits one or several strands, which are made essentially of one metal, a copper alloy, for example.

A further essential object of the present invention concerns, in particular, a conducting device with one or several polymeric and/or mineral fibers and/or strands. One or several of these strands are provided respectively with one or several conducting parts. One or several of these conducting parts are partially or essentially completely made of carbon. They occur, for example, as graphite particles, carbon fibers, and so on. They are embedded in the material of the strands and/or are applied to them as a coating, for instance.

A further essential object of the present invention concerns, in particular, a conducting device with a conducting-part carrier which is executed, for example, as a strand, layer, network, textile, film, etc. On and/or in this conductor is a multiplicity of conducting parts, preferably disposed in the form of conducting particles. To affix the conducting parts to the conducting-part carrier, it can be provided that at least one adhesive is disposed on the conducting-part carrier in sections, which fastens the flaked conducting particles onto the conducting-part carrier to achieve a specific conductivity. It can also be provided that the adhesive has conducting particles embedded in it and fixed to the conducting-part carrier or is itself formed from them. With this arrangement, specific conducting areas or the entire surface can be glued with an adhesive, for instance, directly to the underside of an attachment to be heated, which is subsequently flocked with electrically conducting particles made of a heat-resistant material. If contact conductors are now disposed on the surface to be heated (for instance, near an attachment or interacting with it), a fast-working heating device with few components is therewith created (due to being disposed close to the surface), such as for seats. Applying the conducting resistant particles by spraying (as a lacquer, for example) or by means of pressing (using silver-bearing pastes, for instance) or after fusing a surface (of the attachment, for instance, or of padding lying beneath it), the manufacturing process can even be sped up.

FIGURES

In the following, details of the invention are explained. These embodiments will clearly make up the invention. They are, however, only in the nature of examples. Individual or several features described can also be omitted, altered, or supplemented within the scope of the invention. The features of the different embodiments can of course also be combined with one another. It is crucial that the concept of the invention is, in essence, transformed. If a feature is to be at least partially achieved, then it is concluded that this feature is also entirely achieved or is entirely achieved in essence. "In essence", then, means, in particular, that the transformation permits achievement of the desired use to a marked extent. This can mean, in particular, that a corresponding feature is at least 50%, 90%, 95%, or 99% achieved. If a minimum is specified, then of course more than this minimum can be used. Provided it is not specified otherwise, their boundary points establish intervals.

The following are referred to:

FIG. 2 *b*) A first embodiment of a heating element 4.4 with a strand-shaped conducting device 5 as a heat conductor, which is disposed on a laminar carrier device 8.

FIG. 2 *c*) A second embodiment of a heating device 4.4, in which a multiplicity of strand-shaped conducting devices 5 is laid out on a carrier device 8 between two contact devices 4.6.

FIG. 2 *d*) A third embodiment of a heating device 4.4, in which a multiplicity of conducting particles 7 forms a conducting field 5*a*, which is disposed between two contact devices 4.6.

FIG. 3 *a*1) A first embodiment of a magnified perspective view of a conducting device, for example from FIG. 2*b*), with a strand-shaped conducting-part carrier 5.2 and conducting particles 7 applied to this surface.

FIG. 3 a2) A second embodiment of a conducting device 5 with a strand-shaped conducting-part carrier 5.2, in the volume of which a multiplicity of electrically conducting particles 7 is embedded.

FIG. 3 a3) A third embodiment of a strand-like conducting device 5 with a tube-shaped conducting-part carrier 5.2, whose hollow core is filled with a multiplicity of conducting particles 7.

FIG. 3 b1) A fourth embodiment of a conducting device 5 with a strand-shaped conducting-part carrier 5.2, around which a strand-shaped conducting part 5.1 is spirally/helically wound.

FIG. 3 b2) A fifth embodiment of a conducting device 5, in which strand-shaped conducting parts 5.1 are twisted with strand-shaped carrier parts 5.2.

FIG. 3 b3) A sixth embodiment of a conducting device 5a with a strand-shaped conducting part 5.1 and a conducting-part carrier 5.2 wound helically around it.

FIG. 3 c1) A seventh embodiment of a conducting device 5 with a strand-shaped conducting-part carrier 5.2 and a tube-shaped coating applied to it as a conducting part 5.1.

FIG. 3 c2) An eighth embodiment of a conducting device 5 with a tubular conducting-part carrier 5.2, into which a tubular conducting part 5.1 is inserted. Here a hollow space can remain at the core or a filling can be provided with a conducting or non-conducting material.

FIG. 3 c3) A ninth embodiment of a conducting device 5 with a tubular conducting-part carrier 5.2 and a strand-shaped conducting part 5.1 disposed therein.

DESCRIPTION OF THE INVENTION

Figure 1:
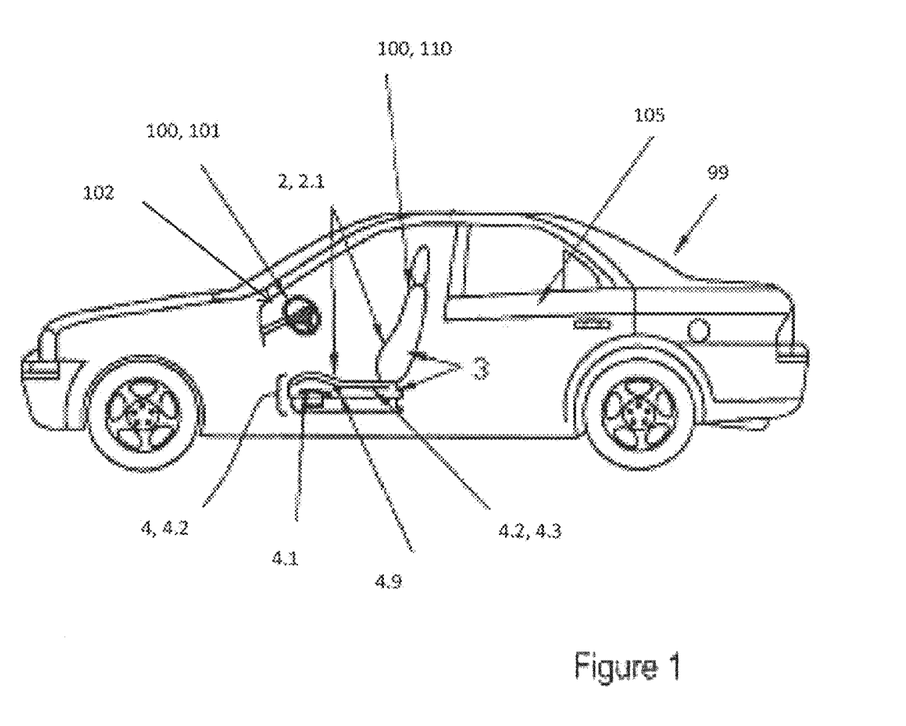
FIG. 1 *a* side view of a vehicle with a heating device 4.4, cut partially lengthwise FIG. 2 *a*) a basic principle of the circuit of such a heating element 4.4

The invention relates to the temperature adjustment of at least one object 100 to be adjusted for temperature. This comprises, in particular, all objects or surfaces touched by people or at risk of freezing, such as, for instance, aircraft bearing surfaces, transmission systems, refrigerators, interior furnishings of houses, doors, windows, roofs, floors, upholstery, etc., or, here, an interior furnishing of an air, water, land, rail, or motor vehicle 99, according to FIG. 1, for instance, such as, for instance steering equipment 101, a steering wheel 102, a dashboard 103, an arm rest, a door panel 105, a seat support, a vehicle canopy, a cushion, an attachment, or, as here, a seat 110.

At least one object 100 to be adjusted for temperature consists of one or several surfaces 10 to be adjusted for temperature. Preferably, it consists of at least one surface 10 to be adjusted for temperature, such as the embodiment of FIG. 1, preferably at least one attachment 2. An attachment means, then, any type of layer, attachment base material, or layered composite that at least partially covers the object to be adjusted for temperature; in particular, such as a laminar component arranged continuously on the object to be adjusted for temperature and/or which is in essence connected and detachable from it. Additionally or alternatively, a surface 10 to be adjusted for temperature can also be provided with one or several coatings. Coatings are, in particular, to be understood as those layers which are disposed at least occasionally as small parts (granulated material or powder, for instance) or fluid (as a spray varnish or molten particles, for example) on the object to be adjusted for temperature and which, after affixing, form a continuous structure of predominantly two-dimensional extent. Additionally or alternatively, a surface 10 to be adjusted for temperature can exhibit at least partially a continuous component 2.1 with essentially laminar components, for instance fabric, leather, fleece, and/or spacer materials, such as spacer fabrics. Several laminar components of the surface to be adjusted for temperature can be sewn together, glued on, riveted, stuck on, welded, etc.

At least one object 100 to be adjusted for temperature preferably consists of one or several cushions 3. These are preferably executed as foam bodies and are a component, for example, of a seat, a steering wheel, and so forth.

One or several air-conditioning systems 4 are assigned to at least one object 100 to be adjusted for temperature and to at least one surface 10 to be adjusted for temperature, in order to adjust for temperature/conditioning the air.

At least one air-conditioning system 4 exhibits one or several air-flow devices 4.1. An air-flow device 4.1 is understood to be any device which can be used to achieve a change in the air composition or air flow at a specified surface or space for air exchange, such as, for example a shelf air-conditioning system, at least a partially air-permeable spacing agent, a spacer fabric, and/or an air-conditioning insert.

At least one air-conditioning system 4 exhibits one or several humidity control devices 4.2. A humidity control device is understand to be a device which serves to regulate the air humidity in its surroundings, especially the air-flow devices 4.1 mentioned, temperature-adjustment devices 4.3, or humidity absorbers such as activated charcoal fibers or polymeric superabsorbers.

At least one air-conditioning system 4 preferably exhibits one or several temperature-adjustment devices 4.3. A temperature-adjustment device 4.3 is understood to be any device that can be used to achieve the targeted change in temperature in its surroundings, for example all devices which exhibit at least one electrical resistance element according to FIGS. 2 and 3, a heat pump, a Peltier element, and/or air movement equipment, for instance a fan, or are formed in essence from them.

At least one temperature-adjustment device 4.3 preferably exhibits an electrical heating device 4.4. Such a heating device is preferably executed as a textile surface-heating elements. It can be inserted, for example, as an insert into the upholstery of a device a seat 110, for instance.

At least one heating device 4.4 preferably exhibits one or several electrical resistance devices 4.5, in order to convert electrical energy into thermal. Preferably, one of several resistance devices 4.5 are arranged so that at temperatures above 100° C., according to the application above 200° C. or above 250° C., their electrical conductivity is at least partially lost. According to the case, this can lie below 150° C., below 200° C., or below 260° C.

At least one resistance device 4.5 preferably exhibits one or several conducting devices 5 for temperature adjustment.

A heating device 4.4 preferably exhibits one or several contact devices 4.6, in order to apply an electrical voltage to at least one resistance device 4.5.

Figure 2A:
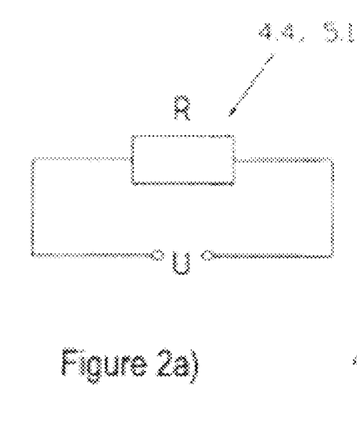
Figure 2B:
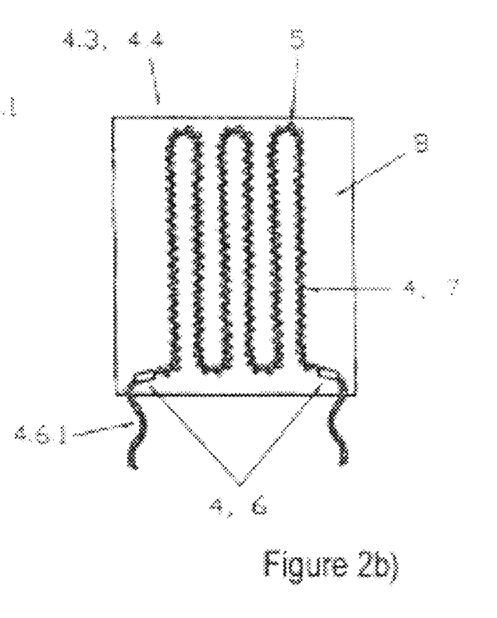
Figure 2C:
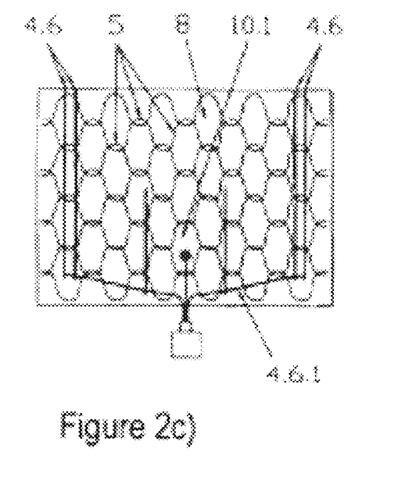
Figure 2D:
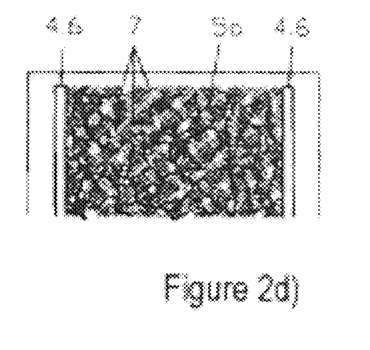
Figure 3:
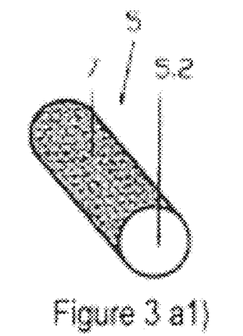

Preferably, the heating device 4.4 exhibits two or more contact devices 4.6, which are disposed, at least partially separated from one another, on one resistance device 4.5. Preferably, they are disposed near the edge along the resistance device 4.5 and are fastened, for example, by sewing, gluing, or pressing thereon. They can exhibit a long, stretched-out contour and run in an essentially meandering and/or straight line (FIG. 2 c,d)). They are preferably disposed somewhat parallel to one another and are connected respectively at one of their ends by a connector cable 4.6.1 to a current/voltage source. If more than two contact devices 4.6 are disposed at a resistance device 4.5, then specific regions 10.1 thereof, independent of the others, can be current-loaded.

A contact device 4.6 preferably exhibits one or several conducting devices 5 to make contact, which are in an electrically conducting connection to a resistance device 4.5. Especially suitable is a number of two to ten, and preferably three to eight, contact conductors.

A heating device 4.4 exhibits in a more meaningful manner one or several temperature sensors. These monitor the temperature level of the heating element and/or the surroundings in order to guarantee maximum comfort and safety. Such a temperature sensor can be a thermostat, for example.

At least one heating device 4.4 exhibits more meaningfully one or several circuit breakers 4.7 in order to cut off the power supply to at least one resistance device and/or one conductor device. Unnecessary power consumption and unpleasant temperatures can thereby be avoided. Such a circuit breaker 4.7 can be formed from at least one conducting device 5, which loses its electrical conductivity at least partially and/or at least occasionally in the event a temperature threshold value is exceeded, for example, by melting or burning through.

An air-conditioning system 4 preferably exhibits one or several detection devices 4.9, for instance in the form of humidity sensors, for determining the humidity at a seat and/or in the air of the surroundings, or other parameters.

The air-conditioning system 4 or one or several of its components (for example a resistance device 4.4, a contact device 4.6, . . . ) one or several conducting devices. These can, for example, be executed as a contact device 4.6 or connector cables 4.6.1 for conducting current, as resistance devices 4.5 for producing heat, and/or detection devices 4.9 for monitoring temperature.

Preferably, the electrical conductivity of at least one conducting device 5 temporarily or permanently is locally reduced or entirely shut off at an undesirably high temperature (for example, 200° C. to 400° C., and even better between 220° C. and 280° C.). This prevents an unduly high rise in temperature. It can be provided that the conducting device 5 is shut of partially or essentially completely, reversibly or irreversibly, in the temperature range cited.

Preferably, the electrical resistance of at least one conducting device 5 varies over at least a specific temperature range about a maximum of 50% of its resistance at room temperature (about 20° C.), and even better a maximum of 30% or 10%. The temperature range preferably encompasses the interval of −10° C. to +60° C., even better −20° C. to +150° C., and even better −30° C. to +200° C. This can, for example, be achieved using pre-loading, warming beds, water baths, and so on. This is especially applicable to synthetic-bearing conducting devices 5. Preferably, the electrical resistance lies between 0 and 3 Ω/m, even better between 0 and 2 Ω/m, and 0.1 and 0.3 Ω/m is even better, and for current transport between 0.1 and 5 Ω/m, by way of example, with 0.8 and 3 Ω/m better for heating.

Preferably, at least one conducting device 5 has at least one conducting part 5.1 for conducting an electrical current and/or at least one conducting-part carrier 5.2 to support the conducting part 5.1.

Preferably at least one conducting-part carrier 5.2 is partially or essentially completely made of a material that exhibits a high resistance to back-and-forth bending and/or a clearly higher material cost and/or a lower tensile or compressive strength than the material of the conducting part 5.1. Additionally or alternatively, a conducting-part carrier 5.2 can also be made of one or several fibers 5.2.1 of a high-strength substance, for instance aramid, carbon, Zylon, etc. A high-strength substance is understood, then, in particular, to be one with a tensile strength of more than 2500 N/mm$^2$ or 2500 MPa. Preferably one or several mineral fibers are used, glass, for instance. This produces a high temperature resistance and is especially suitable for an application in the inner bearing strand of a conducting device.

Additionally or alternatively, preferably one or several conducting-part carriers 5.2 exhibit one or several fibers 5.2.1, which are partially or entirely made up of synthetic material, for example, of carbon, nickeled carbon fibers, Nylon, polyethylene, PVC, polyimide, polyamide (for example 1,2; 3,4; 5,3; 6,6; 6,10; 7,2; or 8,1 polyamides), polypropylene, polyester, polyurethane, etc. These materials are simple to process and are cost-effective. They are especially suitable for an inner strand 5.2.a, as well as an adhesive, for example, in a conducting part 5.1. A synthetic is any synthetic material not occurring in nature, particularly polymers and substances derived from them, such as carbon fibers. Preferably the material selected is elastic and resistant to rupture.

In conducting devices 5 without PTC characteristics, at least one conducting-part carrier 5.1 is preferably so conceived that it loses its material cohesion when a specified temperature is exceeded. For this, it can be effective if the conducting-part carrier 5.2 is made of a material that decomposes chemically or volatilizes as soon as specified temperature values are exceeded, so that it disintegrates at least partially and is disconnected. As a result, the bearing base of the conducting part 5.1 is withdrawn as soon as an undue rise in temperature occurs. It can be advantageous for this if the conducting-part carrier 5.2 shrinks, contracts, and/or ruptures and at the same time a layer lying above it, which forms the conducting part 5.1, corrodes/ruptures, so that the conductivity of the conducting part 5.1 is disrupted. It can be expedient for this if the conducting-part carrier 5.2 is manufactured at least in part from a material with a memory shape. It can be advantageous if the conducting-part carrier 5.2 at least partially melts, softens, or decomposes at temperatures between 100° C. and 400° C., preferably between 150° C. and 300° C., and preferably between 220° C. and 280° C., here at 270° C. At least one conducting-part carrier 5.2 preferably exhibits a material that remains chemically and/or mechanically stable to at least 150° C., preferably to at least 200° C., and preferably to at least 250° C. in a manner at least analogous under normal conditions. The material for general heat management is thereby sufficiently heat-resistant. "Heat-resistant" means that the material concerned changes its form and its strength only insignificantly under everyday temperature changes in all cases, remains chemically stable, and retains the same state of aggregation as under normal environmental conditions.

The electrical resistance of a conducting device 5 with a conductively coated material not only depends on the nature of a conductive coating serving as a conducting part 5.1, but also on the nature of the conducting-part carrier 5.2. In particular, the long-term stability of the electrical resistance is affected strongly thereby, because destruction of the conducting-part carrier 5.2 can also damage the conducting part 5.1 which it carries.

It has been shown that the durability of a conducting-part carrier 5.2 under aging, material fatigue, and thermal loading, especially in polymeric substances, is especially high if at least parts of the material for the conducting-part carrier 5.2 exhibit a high molecular weight and/or a high crystallinity. This holds true at least as long as these loads remain below the melting point, the softening temperature, and/or the decomposition temperature of the material. In order to melt crystals, a specific energy is required per gram. The more or larger the crystals per unit volume of synthetic material, the more energy is required. So the volume-related melting energy (J/g) is a criterion for the crystallinity in a partially crystalline synthetic material.

Extensive tests have shown that the stability is particularly good if at least 50% of the material of the conducting-part carrier 5.2 is in crystalline form, while the remaining portions are in an amorphous structure. Preferably, the crystallinity of a synthetic material is at least 50 J/g, preferably at least 60 J/g, and better still 70 J/g. This increases the adhesion of a coating to the conducting-part carrier 5.2. This is especially true for the synthetics cited above. Furthermore, it has been established, at the same time, that manufacturing the conducting-part carrier 5.2 from a material with a high molecular weight counteracts penetration of water into the carrier material. Preferably, the molecular weight of one, several, or essentially all conducting-part carriers 5.2 amounts for that reason to at least 40,000 g/mol, 100,000 g/mol is better, 130,000 g/mol is even better, and 200,000 g/mol or more is still better. This holds true in particular for the above-mentioned synthetic substances.

Preferably, one or several conducting-part carriers 5.2 exhibit at least portions of a material whose electrical conductivity in relation to at least one influencing parameter is different from at least one material portion of at least one conducting part 5.1. Preferably, the electrical conductivity varies as a function of the temperature.

Conducting-part carrier 5.2 are generally, at least for the most part manufactured of an electrically non-conducting material. It can also be provided, however, that at least one conducting-part carrier 5.2 is made entirely or partially out of an electrically conducting material and one part conducts the current load. This can, for example, be advantageous with conducting devices 5 with PTC characteristics. In such a case, the greater portion of the current preferably flows through the conducting part 5.1 and less than 50%, or better less than 20%, or even better less than 10%, through the conducting-part carrier 5.2. Appropriate for this, for instance, are metals such as copper, steel, or nickel, electrically conducting synthetics, graphite, or mixtures or alloys thereof.

It can be advantageous if the conducting-part carrier 5.2 exhibits a thickness of less than 500 µm, preferably between 100 and 2 µm, preferably between 50 and 0.1 µm, and preferably between 15 and 0.1 µm.

Preferably, at least one conducting-part carrier exhibits an adhesive 5.2.2 at least in sections or is entirely or in part formed thereof, in order to hold one or several conducting parts 5.1 or components thereon. At least one part of the adhesive 5.2.2 is preferably formed at least partially from an at least occasionally gluable and/or nonmetallic substance and/or a substance with the potential to bind joints by surface adhesion (adhesion) and/or internal strength (cohesion). At least one part of the adhesive is preferably at least partially applied by painting, applying the paint to a permanently or occasionally laminar carrier device 8 which remains on the temperature-adjustment device 4.3, which is painted on, pressure-sprayed, or applied in a bath by dipping or by powder coating. This includes, in particular, molten, contact, powdered, and/or sprayed glues or appropriate binding agents. Especially suitable are materials with at least portions of rubber, polyurethane (PU), synthetic resin, glues, and/or plastisols.

Preferably at least one conducting device 5 exhibits one or several conducting parts 5.1. Among such components of the conducting device 5 are understood to be those which exhibit at least in sections and/or occasionally a specific electrical conductivity of at least 1 million Ω/cm, preferably at least 1 Ω/cm.

Preferably one or several conducting parts 5.1 are partially or essentially entirely disposed on or in a conducting-part carrier. This can occur, for example, in a material locking manner, for instance, due to the fact that one or several conducting parts 5.1 are provided as a laminar and/or tubular coating on or around a laminar or strand-shaped conducting-part carrier 5.2. It is also possible, for example, that a conducting part 5.1 is fastened, for instance as a strand, strip, network, or layer which is shape- or force-locked, for example by weaving in, working in, sewing on, sewing to or into a laminar conducting-part carrier 5.2 or coil-shaped wrappings of a strand-shaped conducting-part carrier 5.2. Preferably one or several conducting parts 5.1 are, partially or essentially entirely, directly assigned to a surface to be adjusted for temperature, for instance by assigning to an attachment 2 and/or embedded at least partially in an object 100 to be adjusted for temperature, by lathering, pouring, etc. into upholstery foam, for example.

Preferably one or several conducting parts 5.1 are formed in sections or essentially entirely as a layer 5.1.1 and exhibit at least in sections a material gauge, in particular a layer thickness, of 1 nm to 15 µm, or better yet 1 nm to 1 µm, and even better 20 nm to 0.1 µm. Because only one thin layer can usually, be applied in one processing step, several layers can also be provided one on top of the other. Preferably one or several conducting parts 5.1 are applied in sections or essentially completely by varnishing, dipping, dyeing, or by cathodic dip-varnishing or extruding. A chemically noble material is preferably applied at points or in sections between one or several conducting-part carriers 5.1 and one or several conducting-part carriers 5.2, for example a layer in a proportion of 1-100% silver, palladium, and/or gold. This can produce improved adhesion after the material is applied to a conducting-part carrier 5.2, which forms the true conducting part 5.1 or the greater part of the conducting part 5.1.

Preferably, one or several conducting parts 5.1, in sections or essentially completely, are provided in the form of a strand, strip, network, and/or a coil or spiral. It can be provided that a conducting part 5.1 is shaped irregularly and exhibits, for examples, zones of different material gauge. In particular, the conducting part 5.1 can exhibit cuts, swellings, and/or recesses. For this reason, areas in the conduction part 5.1 can also be produced from a homogeneous material whose electrical resistance is adjusted as desired.

Preferably, one or several conducting parts 5.1 are formed, partially or essentially entirely, from a material that exhibits a PTC characteristic. Materials suitable for this are, for example, graphite-bearing synthetics, especially carbon-black-filled materials. Preferably, a material is used whose electrical resistance at temperatures above 120° C., preferably above 70° C., rise non-linearly in particular. For example the material "7282 PTC Carbon Resistor" from Du Pont is applied, which shows a very sharp, non-linear rise in resistance at about 80° C. to double up to 20 times the value at room temperature. This thereby very simply allows a self-regulating heating element 4.4 to be involved, which cannot overheat under any operating conditions.

Preferably one or several conducting parts 5.1 are manufactured in part or essentially entirely from a material whose conductivity is also stable over the long term in surroundings with elevated air humidity, preferably also from one which exhibits an electrical conductivity, according to a DIN EN 600068-2-30 humidity test, of at least 80%, or better yet 90%, and even better 95%, of its original value. Materials suitable for this are, for instance, those which exhibit at least a portion of one or several of the following materialien: metal, copper, copper alloy, nickel (particularly with phosphorus gadded), carbon particles, carbon fibers, carbonized synthetic filaments, silver, gold, zinc, Baytron, Baytron P, polyaniline (PANI), polythiophene, poly(3,4-ethylenedioxythiopene) (PEDOT), polystyrene sulfonate (PSS), polyacetylene (PA), polyphenylene (PP), polyphenylene vinylene (PPV), polythiophene (PT), and/or combinations and/or compounds, molecules, and/or derivates containing the materials cited.

Preferably, one or several conducting parts 5.1 exhibit one or several fibers 5.2.1 respectively. These can, for example, consist at least partially of an electrically conducting material such as carbon. They can, however, also be formed at least partially from a electrically poor or non-conducting material. Such fibers 5.2.1 are preferably at least partially embedded in the remaining material of the conducting part 5.1 and increase its mechanical strength. Such a conducting part 5.1 could therefore exhibit, for instance, a metallic layer or graphic layer around a strand-shaped conducting-part carrier 5.2 and inclusions of additional carbon or metal fibers.

One or several conducting devices preferably exhibit a multiplicity of conducting particles 7. "Particles" are understood to be small units of matter, for example small pieces, granules, fibers, broken fiber pieces, powder, grains, or mixtures thereof, which preferably are smaller in one, two or three dimensions than 2 cm, better yet 1 cm, even better 5 mm, even better 2 mm, and better yet 1 mm. Diameters of about 50 µm to about 3 mm are preferred, 0.01-4 mm is better, and/or lengths of about 50 µm to about 20 cm (with 0.01-5 cm better). Such conducting particles 7 are cost-effective, corrosion resistant, and temperature insensitive. A conducting particle 7 can at the same time form a conducting part 5.1. It can also be provided that a multiplicity of conducting particles 7 could possibly together form a conducting part 5.1 when using an adhesive 5.2.2.

A certain portion of essentially all of the conducting particles 7 are formed from a preferably homogeneous, preferably electrical conducting material, preferably at least partly of carbon, stell, intrinsically conductive synthetics, carbon-black-filled Lycocell, or other metals. Fiber-like particles are especially suitable, because they make better current conduction possible by embedding in an adhesive 5.2.2. Particularly suitable are carbon nanotubes, graphite nanofibers, or carbon filaments. These guarantee good electrical conductivity, mechanical robustness, and corrosion resistance. Carbon nanotubes (CNT) are tubular forms made of carbon with a diameter of about 1-50 nm and a length of up to several millimeters. The electrical conductivity of the tubes is metallic, semi-conducting, or at low temperatures superconducting. CNTs have a density of 1.3-1.4 g/cm$^3$ and a tensile strength of 45 billion pascal. The current load amounts to about 1000 times that of copper wire. The thermal conductivity at room temperature is 6000 W/m*K. Graphite nanofibers are (massive) fibers of carbon with a diameter smaller than 1 µm.

A certain proportion or essentially all of the conducting particles 7 are at least partially embedded in an adhesive 5.2.2 and/or are held on its surface. It can also be provided that they are completely enclosed by the adhesive 5.2.2. A certain portion or essentially all of the conducting particles 7 are preferably separated, partially or essentially entirely, from one of the surfaces 10 to be adjusted for temperature. In particular, regions of conducting particles 7 not embedded or not held project preferably from the side of an adhesive 5.2.2 away from the user and/or are arranged on this side.

Preferably one or several conducting devices 5, conducting parts 5.1, conducting strands 5.5, resistance elements 4.4, and/or objects 100 to be adjusted for temperature exhibit at least one sheath 5.3, which at least in part is disposed on the surface of a sheathed component and exhibits one or several properties which the surface of the sheathed component does not have. Due to a sheath 5.3, the sheathed component is preferably separated at least partly from its surroundings. A sheath 5.3 is also, for example, a structure that partially covers or shrouds the sheathed component directly or indirectly, but not obligatorily the outermost part of the sheathed component. A sheath 5.3 can, for instance, be executed laminarly as a layer, tubularly as a shroud, or like a network. Such a sheath 5.3 can be at least partially electrically conducting, for instance and form a conducting part 5.1, an EMV shielding, an antistatic coating, and/or a signal communication device, for example. It can also be at least partially electrically poor or not conducting and forms, for instance, insulation, corrosion protection against aggressive agents, transition and hot-spot protection, a gluable connection device, and/or an amplification of the mechanical strength of a conducting device 5.

A sheath 5.3 can be manufactured, partially or essentially completely, from a synthetic substance, adhesive, insulation material, or a conducting material such as metal, for example copper or silver. It can be extruded, for instance, galvanized, dipped, and/or polymerized. Preferably for this at least a part of the surface of the conducting device and/or of the conducting part is coated, especially with a synthetic and/or an adhesive, a lacquer, and/or at least partially with polyurethane, PVC, PTFE, PFA, and/or polyester. Corresponding conducting devices are especially corrosion resistant and can in addition be glued by means of the coating.

It can be advantageous if at least one sheath/**Mantel 5.3 and/or at least one conducting part 5.1 exhibits at least on part of their surface a chemically inactive surface under normal environmental conditions, at least on the surface pointing toward the outside (relative to a conducting-part carrier 5.2 or a sheathed component). "Chemically inactive" means inert, that is, an object so designated is not altered under the action of corrosive substances, at least not by such substances as sulfur, carbonic acid, or fruit acid. The material can also be chosen so that it neither corrodes nor forms electrically conducting corrosion products. A metal can be provided for this whose surface can be passivated and/or oxidized and/or chromed. Noble metals such as gold or silver are particularly suitable for this. It is provided here that at least one conductor if formed at least in part of its surface as metal-bearing, preferably at least in part of nickel, silver, copper, gold, and/or an alloy containing one of these element, preferably essentially entirely of one of the materials mentioned. This reduces the transfer resistance at a contact surface between a heating and a contact conductor. It is effective if the sheath 5.3 is metal-bearing, preferably at least is made in part of an alloy, of nickel with phosphorus added, of silver, copper, and/or of gold, preferably of an alloy which is formed essentially completely from silver, copper, gold, and/or nickel. It can also be made in part or essentially entirely from any of the materials described for the conducting parts and/or for the conducting-part carrier.

Preferably a conducting device 5 has at least one or several conducting fields 5a. This last is understood to be in essence a laminar, at least partially electrically conducting structure. It can, for example, exhibit a film, a textile, or similar as a conductive or non-conductive conducting-part carrier 5.2. A conducting field 5a exhibits in any case one or several conducting parts 5.1. Such conducting parts 5.1 can either themselves form the fundamental component of the conducting field 5a (for example as fleece made of electrically conducting fibers) or be disposed in or on a laminar conducting-part carrier 5.2 (for example as conductor strands sewed on or worked into a textile carrier).

Preferably, a multiplicity of conducting strands 5.5 and/or conducting fields 6 is provided, preferably in one or several contact devices 4.6 and/or one or several resistance devices 4.5. Preferably, one or several conducting strands 5.5/conducting fields 6 of a contact device 4.6 is spatially and/or electrically connected to one or several conducting strands 5.5/conducting fields 6 of a resistance device 4.5.

At least one conducting device 5 and/or one conducting field 5a preferably has respectively one or several conducting strands 5.5 or is at least partially executed as such. The conducting strand 5.5 can, for instance, be a heating strand, a contact strand, an electrical safety, and/or a connecting conductor. A conducting strand 5.5 is at least in part an electrically conducting strand in which extend one or several filament-like, at least partially electrically conducting components, preferably essentially along the longitudinal direction of the strand and/or in a helical form around it or disposed within it. A conducting strand 5.5 can itself be constructed from a multiplicity of conducting strands 5.5 or further partial strands, for instance non-conducting ones.

A strand is understood here to be a long structure whose lengthwise measurements greatly exceed the measurements of its cross-sectionwise. Preferably, the two dimensions of its cross-section exhibit approximately similar measurements. Preferably, the structure is elastic in bending. "Filament-like" is here understood such that an object so designated is formed of a short or a long fiber or of a monofilament or multifilament threads. Preferably, it has at least one strand in at least one dimension a transverse measurement of less than 1 mm, 0.1 mm is better, and 10 µm even better.

Preferably one or several conducting devices 5 and/or several conducting strands 5.5 exhibit a multiplicity of conducting strands 5.7, preferably more than five, preferably more than 50, preferably more than 100, and preferably more than 300. One, several, or essentially all of the conducting strands 5.7 thus exhibit a thickness of less than 1 mm, preferably less than 0.1 mm, and preferably less than 10 µm. A conducting strand 5.7 is a strand that forms, together with additional strands, a super-lattice strand. It can be advantageous if a conducting strand 5.5 and/or a conducting device 5 exhibit two or more different types of conducting strands 5.7. It can be provided that these exhibit materials differing from one another and/or different measurements.

Preferably, one, several, or essentially all of the conducting strands 5.7 of a conducting strand 5.5 and/or a conducting device 5 be made at least in part out of copper or a copper alloy, preferably formed essentially thereof. It can also be provided that one, several, or essentially all of the conducting strands 5.7 of a conducting strand 5.5, of a conducting-part carrier 5.2, and/or of a conducting device 5 be made of a synthetic substance and exhibit a sheathing with copper and/or a copper alloy. Preferably, less than 50% of the conducting strands 5.7 are provided of copper, a copper alloy, and/or another metal-bearing material, preferably 1% to 40%, preferably 10% to 35%. Preferably, a number of more than 50% of the conducting strands 5.7 are provided with a synthetic core, preferably between 60% and 99%, preferably between 60% and 80%. These values have been established, after several series of tests, as especially favorable with regard to cost and durability.

Preferably, one or several support strands 5.8 are provided, which take up a large part of the mechanical load of the conducting strand 5.5 and/or of the conducting device 5. They are preferably of a material that is stronger/more loadable/less elastic than the material of the other strands, such as here, for example, essentially of polyester or steel. They are preferably, depending on the use, also thicker and more numerous than the other strands. For this reason, thin strands also effectively protect against bending and tensile stresses. The support strands 5.8 can be partially or essentially completely manufactured from an electrically conducting material a also from an electrically poor or non-conducting material.

Preferably, one, several, or essentially all of the conducting strands 5.7 are electrically insulated, in sections or essentially completely, from one, several, or essentially all of the rest of the conducting strands 5.7 of a strand. This can occur, for example, by separation from one another, by providing an air gap, for instance, or by coating one or several conducting strands 5.7 or filling the inter-strand spaces with an insulating material. An insulating material is understood to be any material whose specific electrical conductivity is at most one tenth the specific electrical conductivity of at least one conducting strand 5.1 of a conducting strand 5.5.

Preferably at least one conducting device 5, at least one conducting-part carrier 5.2, at least one conducting strand 5.5, at least one partial strand 5.7 exhibit at least in sections a round cross-section. This allows for cost-effective manufacture. Alternatively or additionally, for the same of additional structural components, a non-round, in particular a polygonal or star-shaped cross-section can be considered. This allows for a expansion of the surface area. The electrical resistance of a coating is thereby reduced in comparison to a coating of the same thickness with a round cross-section. A three-lobed cross-section can additionally increase resistance to wear One or several conducting parts 5.1 and/or one or several conducting strands 5.5 preferably exhibit a spiral-shaped spatial arrangement, preferably by drilling, threading, or twisting with one another and/or by a coil-shaped arrangement around a strand, for example a conducting-part carrier 5.2. This makes an especially tensile-load-bearing heating conductor possible.

A conducting device 5 preferably exhibits one or several carrier devices 8, in order to support further components (for example the conducting device 5). One or several such further components are fastened on, for instance, by sewing on, with or without auxiliary threads, gluing, bonding, working on or in, weaving in, steaming, galvanizing, etc. to such a carrier device 8.

One or several carried devices 8 are preferably essentially strand-shaped, network-like, and/or laminar and at least partly formed from textile, fabric, framework, webbing, fleece, bendable thermoplastics, air-permeable material, and/or a film (stamped or rubbed, for instance). One or several carrier devices 8 can also be formed in part or essentially entirely by at least one part of the object 100 to be adjusted for temperature, for example an interior furnishing or at least one part of the surface 10 to be adjusted for temperature, of the attachment 2, for instance. Because the same requirements hold for a carrier device 8 with respect to its mechanical, chemical, and electrical properties as for the conducting-part carrier 5.2, it can be provided that they are formed partially or essentially entirely from at least one of the material recommended here for the conducting carriers 5.2. It can also be provided that a conducting-part carrier 5.2 itself forms a carrier device 8.

REFERENCE NUMBERS

2 Attachment
2.1 Structural component
3 Cushion
4 Air-conditioning equipment
4.1 Air-flow equipment
4.2 Humidity control equipment 4.3 Temperature-adjustment device
4.4 Heating equipment
4.5 Resistance device
4.6 Contact device
4.6.1 Connector cabling
4.7 Circuit breaker
4.9 Detection equipment
5 Conducting device
5a Conductive field
5.1 Conducting part
5.1.1 Coat
5.2 Conducting-part carrier
5.2.1 Fibers
5.2.2 Adhesive
5.2.a Inside strand
5.4 Sheath
5.5 Conducting strand
5.7 Part strand
5.8 Support strand
6 Conductive field
7 Conducting particles
8 Carrier device
10 Surface to be adjusted for temperature
10.1 Region
99 Vehicle
100 Object to be adjusted for temperature
101 Steering equipment
102 Steering wheel
103 Dashboard
105 Door panel
110 Seat

The invention claimed is:

1. A heating device comprising:
at least one conducting device having:
a conducting-part carrier core comprising a synthetic material, the synthetic material of the conducting-part carrier core at least partially decomposes at a temperature between about 200° C. and about 400° C.;
a conductive part partially or entirely disposed on the conducting-part carrier core and in electrical communication with a current source;
a connector cable connecting the at least one conducting device to the current source;
wherein the conducting-part carrier core comprises a material that exhibits a high resistance to back-and-forth bending and has a tensile strength of more than 2500 N/mm²;
wherein the conductive part exhibits zones of different material gauge including one or more cuts, swellings, and/or recesses;
wherein the synthetic material of the conducting-part carrier core is comprised of a material in at least 50% crystalline form and a remainder of the material is an amorphous structure;
wherein the synthetic material has a crystallinity of at least 50 J/g;
wherein the synthetic material of the conducting-part carrier core has a molecular weight of 130,000 g/mol or more; and
wherein an electrical conductivity of the at least one conducting device is permanently shut off when the synthetic material of the conducting-part carrier core at least partially decomposes.

2. The heating device of claim 1, wherein the conductive part includes a plurality of conducting particles comprising at least partially carbon, steel, intrinsically conductive synthetics, or carbon-black filled Lycocell.

3. The heating device of claim 2, wherein the synthetic material of the conducting-part carrier core comprises nickeled carbon fibers, nylon, polyethylene, polyamide, polyamide, polypropylene, polyester, or polyurethane.

4. The heating device of claim 1, wherein the synthetic material of the conducting-part carrier core at least partially melts, softens, or decomposes at a temperature between 150° C. and 300° C., the conducting part corrodes, ruptures, or both when the conducting-part carrier core at least partially melts, softens, or decomposes so that the conducting part is unable to conduct electrical energy from the current source.

5. The heating device of claim 1, wherein the conducting-part carrier core is laminar or strand-shaped and the conductive part is a laminar coating, a tubular coating, or both disposed on or around the conducting-part carrier core.

6. The heating device of claim 1, wherein the conducting part is fastened as a strand, strip, network, or layer that is shape-locked or force-locked by weaving in, working in, sewing on, sewing to, or sewing into, the conducting-part carrier core.

7. The heating device of claim 1, wherein the conducting part is a coil-shaped wrapping around the conducting-part carrier core.

8. The heating device of claim 1, wherein the conducting-part carrier core is an inter-strand space that includes an insulating material, and the insulating material is coated with the conductive part that includes conducting particles that are a highly conductive material.

9. The heating device of claim 1, wherein the conductive part comprises a multiplicity of particles which in at least two directions are smaller than 1 mm and are embedded in an adhesive applied to the conducting-part carrier core.

10. The heating device of claim 1, wherein at least one temperature sensor monitors a temperature level of the heating device.

11. A heating device comprising:
at least one conducting device having:
a conducting-part carrier core comprising a synthetic material;
a conductive part partially or essentially entirely disposed on the conducting-part carrier core and in electrical communication with a current source; and,
a connector cable connecting the at least one conducting device to the current source;
wherein the conductive part is a layer of silver that exhibits zones of different material gauge including, one or more cuts, swellings, and/or recesses;
wherein the synthetic material of the conducting-part carrier core includes a material that is comprised of at least 50% crystalline form and a remainder of the material is an amorphous structure,
wherein the synthetic material of the conducting-part carrier core is made of nickeled carbon fibers, nylon, polyethylene, polyamide, polyamide, polypropylene, polyester, or polyurethane,
wherein the conducting-part carrier core disintegrates at a temperature between 150° C. and 300° C., and
wherein the conductive part ruptures when the conducting-part carrier core disintegrates so that conductivity of the at least one conducting device is permanently shut off so that the conducting part is unable to convert an electrical energy communicated from the current source into thermal energy.

12. The heating device of claim 11, wherein the synthetic material of the conducting-part carrier core at least partially melts, softens, or decomposes at a temperature between 220° C. and 280° C., and wherein the conductive part includes a plurality of conducting particles comprising at least partially carbon, intrinsically conductive synthetics, or carbon-black filled Lycocell.

13. The heating device of claim 11, wherein the heating device includes two or more contact devices that are disposed, at least partially separated from one another, near an edge of the heating device, the two or more contact devices being somewhat parallel to one another and being connected at one end by the connector cable so that the two or more contact devices are connected to the current source;
   wherein the at least one conducting device is connected to and extends between the two or more contact devices;
   wherein the synthetic material of the conducting-part carrier core at least partially melts, softens, or decomposes at a temperature between 220° C. and 280° C.;
   wherein the conductive part is formed at least partially from carbon, intrinsically conductive synthetics, or carbon-black filled Lycocell; and
   wherein the conducting part corrodes, ruptures, or both when the conducting-part carrier core at least partially melts, softens, or decomposes so that the conducting part is unable to convert an electrical energy communicated from the current source into thermal energy.

14. The heating device of claim 11, wherein a specific energy of at least 70 J/g is required to melt the synthetic material of the conducting-part carrier core, and the synthetic material of the conducting-part carrier core has a molecular weight of 200,000 g/mol or more.

15. A vehicle seat comprising: the heating device of claim 11, wherein the vehicle seat includes at least one air conditioning system having a heat pump and a fan.

16. The heating device of claim 11, wherein the conductive part is at least partially made of powder that is embedded in an adhesive applied to the conducting-part carrier core.

17. A heating device comprising:
   at least one conducting device having:
      a conducting-part carrier core comprising a synthetic material, the synthetic material at least partially decomposes at a temperature between about 200° C. and about 400° C.;
      a conductive part partially or essentially entirely disposed on the conducting-part carrier core and in electrical communication with a current source, the conductive part being at least partially made of a multitude of conductive particles which in at least two directions are smaller than 1 mm; and
      a connector cable connecting the at least one conducting device to the current source;
   wherein an electrical conductivity of the at least one conducting device is permanently shut off when the synthetic material of the conducting-part carrier core at least partially decomposes;
   wherein the conductive part exhibits zones of different material gauge including one or more cuts, swellings, and/or recesses;
   wherein the carbon particles are a powder embedded in an adhesive that is applied to the conducting-part carrier core;
   wherein the synthetic material of the conducting-part carrier core is comprised of a material in at least 50% crystalline form and a remainder of the material is an amorphous structure;
   wherein a crystallinity of the synthetic material is at least 50 J/g; and
   wherein the synthetic material of the conducting-part carrier core has a molecular weight of 130,000 g/mol or more.

18. The heating device of claim 17, wherein an electrical conductivity of the at least one conducting device is at least locally permanently interrupted at temperatures between 200 and 400 degrees Celsius.

19. The heating device of claim 18, wherein the synthetic material of the conducting-part carrier core at least partially melts, softens, or decomposes at a temperature between 220° C. and 280° C. so that the conducting-part carrier core volatizes so that the conducting part ruptures so that the electrical conductivity of the conducting part is disrupted.

20. The heating device of claim 17, wherein the conducting-part carrier core comprises a material that exhibits a high resistance to back-and-forth bending and has a tensile strength of more than 2500 N/mm.

* * * * *